(12) United States Patent
Hudson

(10) Patent No.: US 11,673,619 B2
(45) Date of Patent: Jun. 13, 2023

(54) ARTICULATED WORK VEHICLE WITH STEERING SELECTION

(71) Applicant: DEERE & COMPANY, Moline, IL (US)

(72) Inventor: Scott A. Hudson, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 952 days.

(21) Appl. No.: 16/560,452

(22) Filed: Sep. 4, 2019

(65) Prior Publication Data

US 2021/0061374 A1    Mar. 4, 2021

(51) Int. Cl.
*B62D 7/15* (2006.01)
*B62D 12/00* (2006.01)
*B62D 49/06* (2006.01)
*B60W 10/20* (2006.01)

(52) U.S. Cl.
CPC ......... *B62D 49/0621* (2013.01); *B60W 10/20* (2013.01); *B62D 7/15* (2013.01); *B62D 12/00* (2013.01); *B60W 2540/18* (2013.01)

(58) Field of Classification Search
CPC ...... B62D 49/0621; B62D 7/15; B62D 12/00; B60W 10/20; B60W 2540/18
See application file for complete search history.

(56) References Cited

U.S. PATENT DOCUMENTS

| | | | |
|---|---|---|---|
| 4,042,053 A * | 8/1977 | Sieren | B62D 53/02 180/265 |
| 5,802,489 A | 9/1998 | Orbach et al. | |
| 5,996,722 A | 12/1999 | Price | |
| 7,383,114 B1 | 6/2008 | Lange et al. | |
| 11,161,544 B2 * | 11/2021 | De Grammont | B62D 7/142 |
| 2014/0163806 A1 | 6/2014 | Aznavorian et al. | |
| 2015/0066298 A1 | 3/2015 | Sharma et al. | |
| 2015/0259882 A1 * | 9/2015 | Sharma | E02F 9/225 701/41 |
| 2018/0050724 A1 | 2/2018 | Morselli et al. | |

(Continued)

FOREIGN PATENT DOCUMENTS

| | | |
|---|---|---|
| DE | 112013000777 T5 | 10/2014 |
| EP | 1174329 A2 | 1/2002 |

OTHER PUBLICATIONS

German Search Report issued in counterpart application No. 102020209832.8 dated Apr. 29, 2021 (14 pages).

*Primary Examiner* — Tisha D Lewis
(74) *Attorney, Agent, or Firm* — Taft Stettinius & Hollister LLP; Stephen F. Rost

(57) ABSTRACT

An automatic steering system and method for an articulated work vehicle having a front wheel steering system supported by front wheels at a front frame and a rear frame supported by rear wheels rotatably coupled to the front frame at an articulator. A controller operatively connected to the front wheel steering system and to the articulator adjusts wheels of the front wheel steering system along a path and moves the articulator to direct the rear frame in response to a steering signal. The steering signal directs the vehicle in a minimum turn radius mode or a controlled traffic control mode. In the minimum turn radius mode, the rear wheels do not follow the tracks of the front wheels when making a turn. In the controlled traffic mode the rear wheels follow in same tracks as the front wheels.

18 Claims, 9 Drawing Sheets

(56) References Cited

U.S. PATENT DOCUMENTS

| | | | |
|---|---|---|---|
| 2018/0118256 A1* | 5/2018 | Ge | B62D 12/00 |
| 2019/0000007 A1* | 1/2019 | Schleicher | A01B 69/001 |
| 2020/0056348 A1* | 2/2020 | Veasy | E02F 9/2004 |
| 2020/0291609 A1* | 9/2020 | Tevis | B62D 9/04 |

* cited by examiner

ARTICULATED WORK VEHICLE WITH STEERING SELECTION

FIELD OF THE DISCLOSURE

The present disclosure generally relates to an articulated work vehicle, and more particularly to an articulated work vehicle having steering control modes.

BACKGROUND

Work vehicles are configured to perform a wide variety of tasks for use such as construction vehicles, forestry vehicles, lawn maintenance vehicles, as well as on-road vehicles such as those used to plow snow, spread salt, or vehicles with towing capability. Additionally, work vehicles include agricultural vehicles, such as a tractor or a self-propelled combine-harvester, which include a prime mover that generates power to perform work. In the case of a tractor, for instance, the prime mover is often a diesel engine that generates power from a supply of diesel fuel. The diesel engine drives a transmission which moves wheels or treads to propel the tractor across a field.

Tractors generally include four or more wheels, in which two or more wheels sharing a common axle are located toward the front of the vehicle, and two or more wheels sharing a common axle are located toward the rear of the vehicle. Other configurations of axles are known and include tractors having two rear axles or tractors including a front axle, a middle axle and a rear axle.

Tractors of different types include front wheel drive, rear wheel drive, four wheel drive, or all-wheel drive systems. In addition, tractors of different types include a non-articulated frame such that the position of the front axle and the position of the rear axle cannot be adjusted along a longitudinal axis of the tractor. Other tractors include an articulated frame wherein the front axle is mounted to a front frame, the rear axle is mounted to a rear frame, and the front frame is rotatably coupled to the rear frame at a pivot location, such that the front frames and the rear frames are articulable with respect to one another. In some embodiments of an articulable tractor, the rotatable coupling can be locked to prevent articulation.

While articulable tractors provide a large amount of traction, and are often used for tilling crops or for pulling heavy loads, precise control of the articulable tractor can present certain problems due to the nature of steering adjustment. Consequently, what is needed is an articulating tractor having a steering system configured to provide for improved steering under one or more or all conditions, including steering the tractor within a field being tilled, steering the tractor in a field being planted, or steering the tractor from a field while pulling harvested crop or livestock.

SUMMARY

In one embodiment, there is provided an articulated vehicle for moving along a surface including a front frame supported by front wheels and a front wheel steering system operatively connected to the front wheels and configured to adjust a position of the front wheels with respect to the front frame. The front wheel steering system includes a steering control input. A rear frame is rotatably coupled to the front frame at a pivot defining an axis of articulation, wherein the rear frame is supported by rear wheels. An articulator is disposed at or near the pivot, wherein the articulator is configured to adjust the position of the rear frame with respect to the front frame at the axis of articulation. The articulator includes an articulator input. A user input is operatively connected to the steering control input and is operatively connected to the articulator input. The user input includes a control mode input configured to automatically control steering of the articulated vehicle for predetermined steering conditions.

In another embodiment, there is provided an automatic steering system for an articulated work vehicle having a front frame having a front wheel steering system supported by front wheels and a rear frame supported by rear wheels and rotatably coupled to the front frame at a pivot defining an axis of articulation. The automatic steering system further includes an articulator configured to adjust the position of the rear frame with respect to the front frame. A receiver is configured to receive a steering instruction. The automatic steering system includes a front wheel steering sensor operatively connected to the front wheel steering system and an articulation joint sensor operatively connected to the articulator. A front wheel steering control input is operatively connected to the front wheel steering system. An articulator input is operatively connected to the articulator. A controller is operatively connected to the front wheel steering sensor, to the articulation joint sensor, to the front wheel steering control input, to the articulator input, and to the receiver to receive the steering instruction. The controller includes a processor and a memory, wherein the memory has a plurality of program instructions stored thereon, that in response to execution by the processor causes the control circuitry to: identify a position of the front wheels with the front wheel steering sensor; identify a position of the rear wheels with the articulation joint sensor; generate a first control signal based on the steering instruction and the identified position of the front wheels; generate a second control signal based on the steering instruction and the identified position of the rear wheels; and adjust the position of the front wheels based on the first control signal and adjust the position of the rear wheels based on the second control signal.

In a further embodiment, there is provided a method of automatically steering an articulated work vehicle having a front frame including a front wheel steering system supported by front wheels, a rear frame supported by rear wheels and rotatably coupled to the front frame at a pivot defining an axis of articulation, and an articulator configured to adjust the position of the rear frame with respect to the front frame. The method includes: receiving, at the articulated work vehicle, a steering control signal from a global positioning system; adjusting a position of the front wheels using the front wheel steering system based on the received steering control signal; and adjusting a position of the rear wheels using the articulator based on the received steering control signal to position of the rear wheels to follow the same path as the front wheels to ensure that the rear wheels follow in the same tracks as the front wheels.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
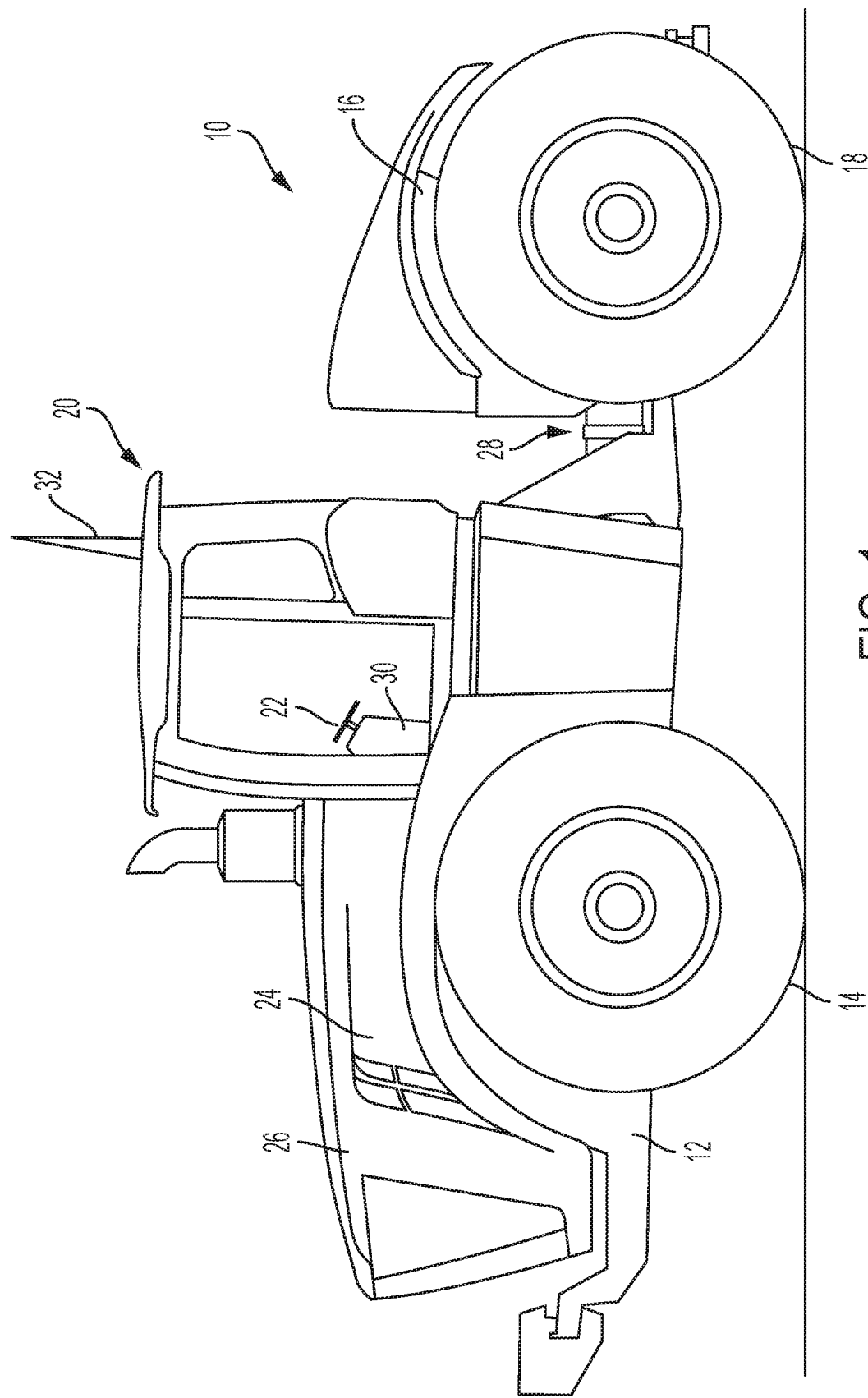
FIG. 1 is an elevational side view of a work vehicle, and more specifically, of an agricultural vehicle such as an articulating tractor.

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

For the purposes of promoting an understanding of the principles of the present disclosure, reference will now be made to the embodiments described herein and illustrated in the drawings and specific language will be used to describe the same. It will nevertheless be understood that no limitation of the scope of the disclosure is thereby intended, such alterations and further modifications in the illustrated devices and methods, and such further applications of the principles of the disclosure as illustrated therein being contemplated as would normally occur to one skilled in the art to which the disclosure relates.

FIG. 1 is an elevational side view of a work vehicle 10, for example a construction or agricultural vehicle such as an articulating tractor, hereinafter referred to as a vehicle 10, including a front frame 12 supported on front set of wheels 14 and a rear frame 16 supported on a rear set of wheels 18. While wheels are described in the embodiments, other ground engaging traction devices, including treads, are contemplated. In the illustrated embodiment, the front wheels 14 are steerable with respect to longitudinal axis of the frame 12 to be inclined with respect to an axle (not shown) supporting the wheels 14. The rear wheels 18 are fixed with respect to a longitudinal axis of the rear frame 16. In other embodiments, steerable rear wheels 18 are contemplated.

An operator cab 20 is mounted on the front frame 12 and contains various controls for the vehicle 10 so as to be within the reach of a seated or standing operator. In one aspect, these controls may include a steering wheel 22. A prime mover 24, such as an engine, is mounted on the frame 12 beneath a housing 26 and supplies power for driven components of the vehicle 10. The engine 24, for example, is configured to drive a transmission (not shown), which is coupled to drive the front wheels 14 at various selected speeds and either in forward or reverse modes. The transmission is also coupled to the rear wheels 18 at an articulation joint 28 as would be understood by one skilled in the art. The articulation joint 28 includes a pivot defining an axis of articulation about which the rear frame 16 articulates with respect to the front frame 12. In the illustrated embodiments, both the front set of wheels 14 and the rear set of wheels 18 are driven to move the tractor in an all-wheel drive mode to move the vehicle 10. Other configuration of driving the wheels 14 and 18 are contemplated including front wheel drive or rear wheel drive.

While the described embodiments are discussed with reference to a tractor, in addition to addition to agricultural vehicles, other work vehicles are contemplated including construction vehicles, forestry vehicles, lawn maintenance vehicles, as well as on-road vehicles such as those used to plow snow, spread salt, or vehicles with towing capability.

The cab 20 defines an operator workstation 30, which is supported by the frame 12. The cab 18 also encloses a seat (not shown) for seating the operator. The operator workstation 30, in different embodiments, includes one or more of an operator user interface 130 (see FIG. 4) including the steering wheel 22, a joystick, an accelerator pedal, and a power take-off (PTO) control device for turning on or off the PTO. Pedals for a brake and a clutch are also located in the cabin 20, but are not shown.

The user interface includes a plurality of operator selectable buttons configured to enable the operator to control the operations and functions of the vehicle 10. The user interface, in one embodiment, includes a user interface screen having a plurality of user selectable buttons to select from a plurality of commands or menus, each of which is selectable through a touch screen having a display. In another embodiment, the user interface includes a plurality of mechanical push buttons as well as a touch screen. In another embodiment, the user interface includes a display screen and only mechanical push buttons. A communication antenna 32 is supported by the cab 18 and provides for the transmission and reception of signals transmitted through the air. In one embodiment, the communication antenna 32 is a global positioning system (GPS) antenna configured to receive and to send global positioning data to and from a GPS satellite as is known by those skilled in the art. Steering commands, when included in the GPS transmission, direct the vehicle 10 along the field being worked.

Figure 2:
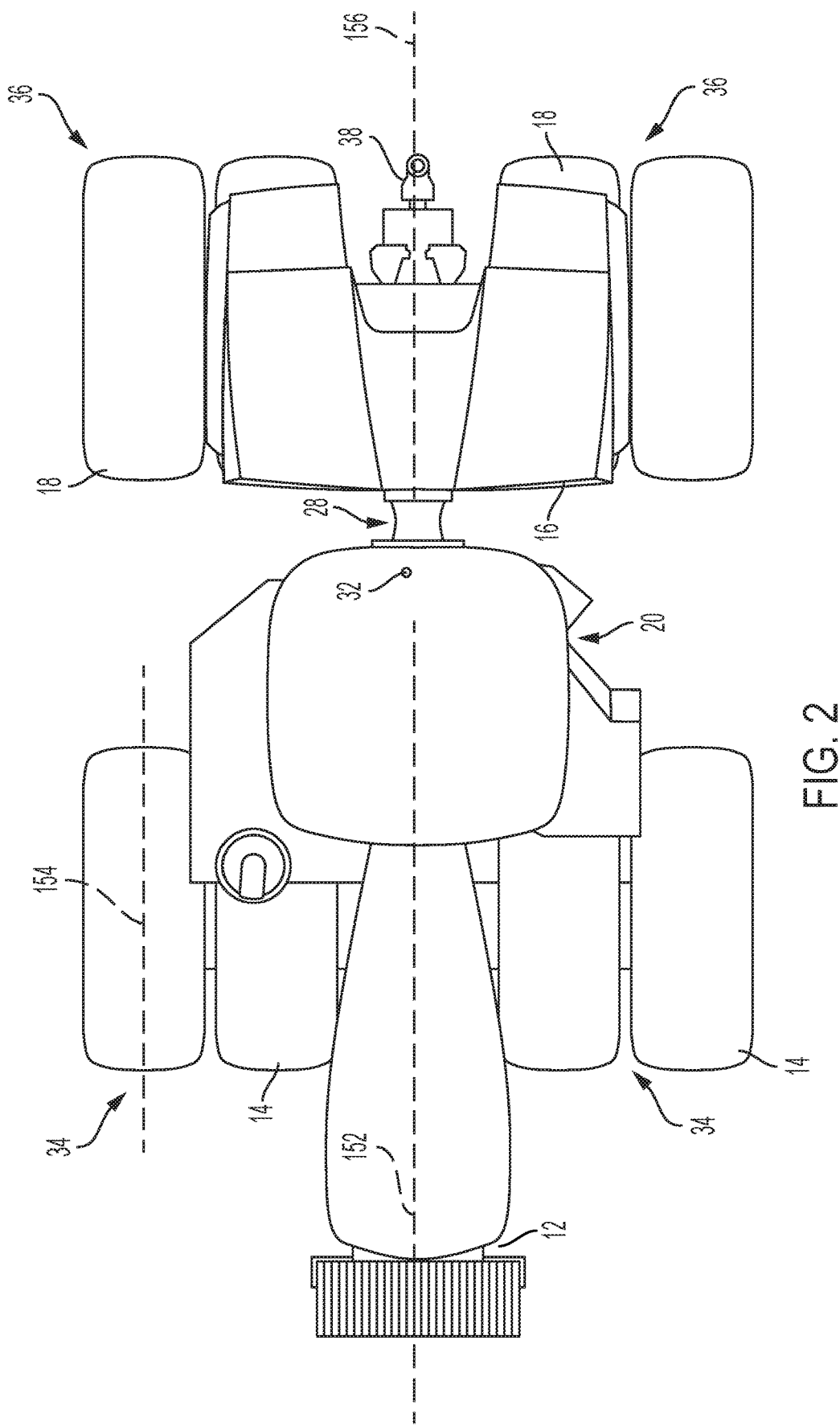
FIG. 2 is a top view of an articulating tractor having a front frame and a rear frame aligned along a longitudinal axis.

In FIG. 2, the vehicle 10 includes the set of front wheels 14 having two sets 34 of dual wheels 14. The rear wheels 18 include two sets of dual wheels 36. A hitch 38 extends from the rear frame 16 between each set 36 of rear wheels 18. In this configuration, the longitudinal axis of the front frame 12 is aligned with the longitudinal axis of the rear frame 16 along the same axis extending from the front of the front frame 12 to the rear of the rear frame 16.

The articulation joint 28, as illustrated in FIG. 2, is located at a zero (0) degree inclination, such that the vehicle 10 when moving in either a forward direction of a rearward direction, moves along a straight line path upon a relatively flat, even, and level surface. When the vehicle 10 is traveling in a substantially straight line path, a longitudinal axis 152 of the front frame 12, a longitudinal axis 154 of the front wheels 14, and a longitudinal axis 156 of the rear frame 16 are all substantially parallel, and the longitudinal axis 152 of the front frame 12 and the longitudinal axis 156 of the rear frame 16 are substantially colinear.

Figure 3:
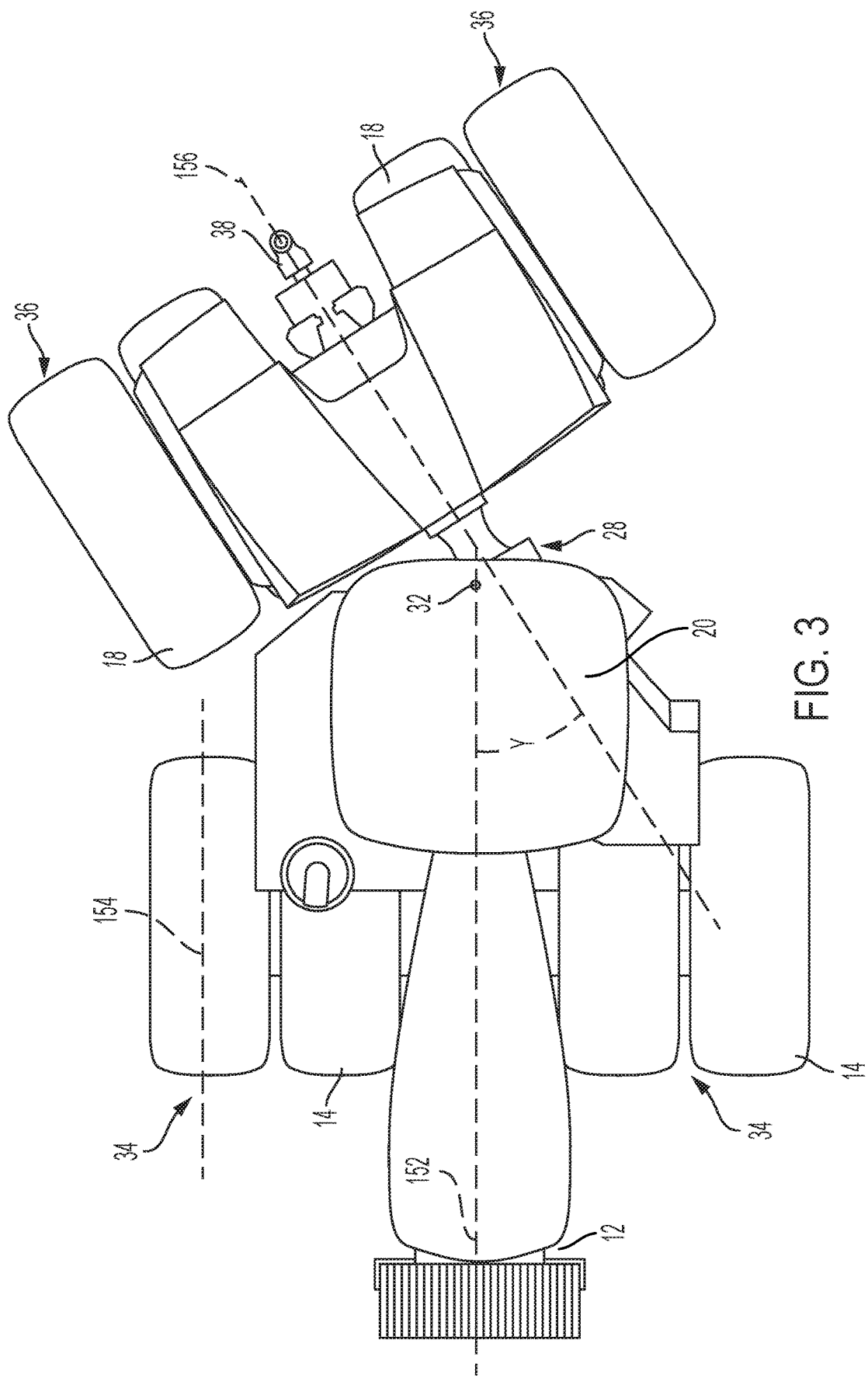
FIG. 3 is a top view of an articulating tractor having a front frame and a rear frame, wherein the rear frame is articulated with respect to the front frame.

In FIG. 3, the articulation joint is located at approximately a thirty (30) degree inclination to the right of the longitudinal centerline of the front frame 12. In this configuration, the vehicle 10 turns in a rightward direction with respect to the operator located in the cab 20. When the vehicle 10 is articulated, as shown for example in FIG. 3, the longitudinal axis 154 of the front wheels 14 and the longitudinal axis 152 of the front frame 12 are substantially parallel, and the longitudinal axis 156 of the rear frame 16 is at an angle Y greater than zero to the longitudinal axis 152 of the front frame 12.

Figure 4:
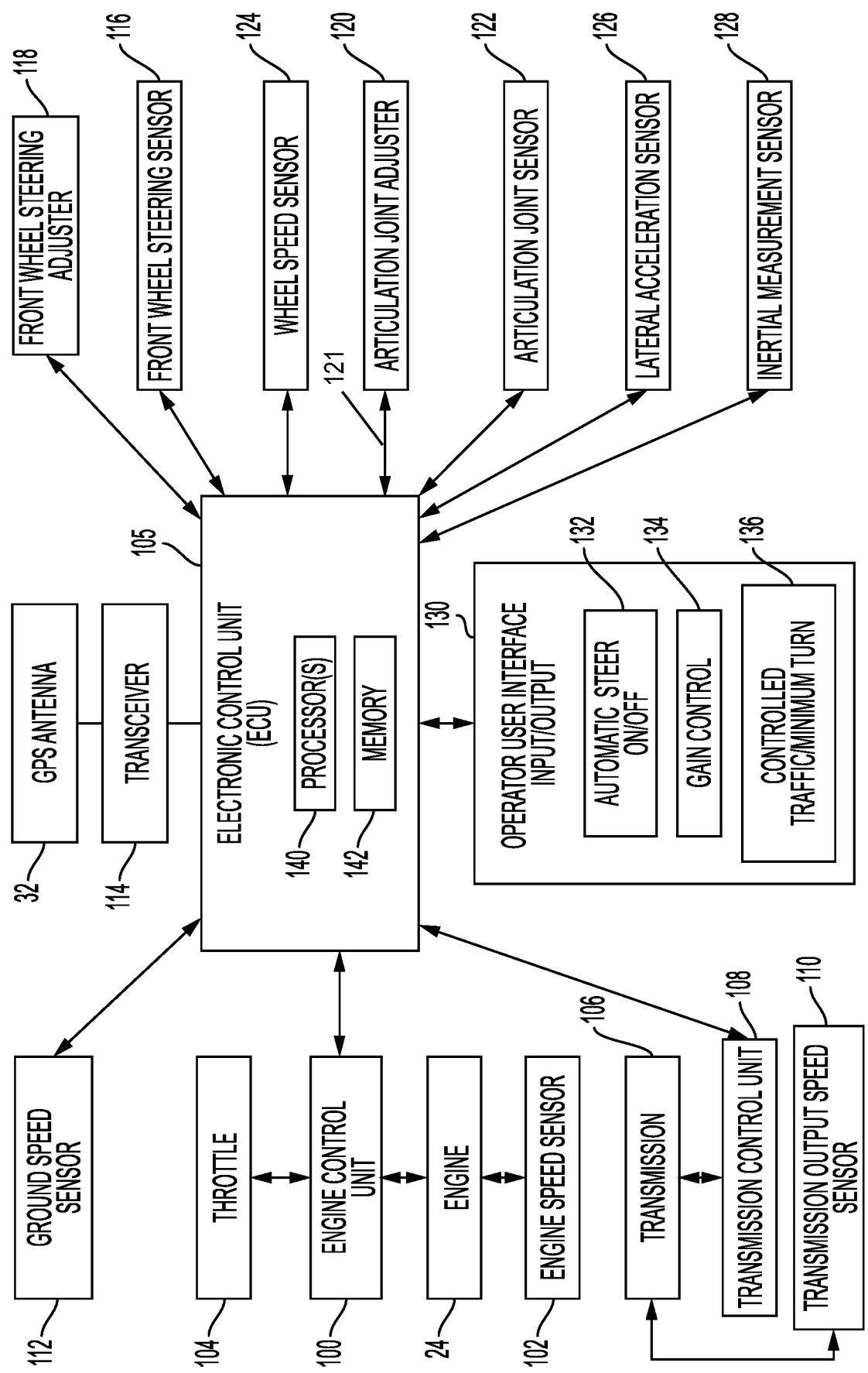
FIG. 4 is a control system block diagram of one embodiment of an articulated vehicle system.

As further illustrated in FIG. 4, the vehicle 10 includes the engine 24 which is operatively connected to an engine control unit 100, which in one embodiment is operatively connected to an engine speed sensor 102 configured to determine the speed of the engine 24. A throttle 104 is operatively connected to the engine control unit 100 to adjust the speed of the engine, and therefore the vehicle speed as would be understood by one skilled in the art. In another embodiment, the throttle 104 is additionally a machine controlled throttle which is automatically controlled by an electronic control unit (ECU) 105, also known as a controller, in response to vehicle speed information. The engine control unit 100 is operatively connected to the ECU 105, which is located in the cab 20 or at other locations within the vehicle 10. The ECU 105 is configured to receive and to process vehicle information received from the engine control unit 100.

A transmission 106 is operatively connected to the front wheels 14 and to the rear wheels 18 to move the vehicle in a forward or a reverse direction. A transmission control unit 108 is operatively connected to the ECU 105. A transmission output speed sensor 110 is operatively connected to the transmission 106 and is configured to determine the output speed of the transmission 106. The output speed of the transmission 106 determines the rotational speed of the wheels, and therefore the speed of the vehicle.

In addition to the engine speed sensor 102 and the transmission output speed sensor 110, other vehicle environment sensors are operatively connected to the ECU 105 to monitor the operating conditions of the vehicle. A ground speed sensor 112 is operatively connected to the ECU 105 to provide the ground speed of the vehicle 10 as it moves in the forward or in a reverse direction. In one embodiment, the ground speed sensor 112 is a radar unit connected to the vehicle and is configured to provide a radar signal to the ECU 105 for determining speed. In another embodiment, a ground speed signal is provided by the GPS antenna 32 through a receiver or transceiver 114 configured to communicate with the global positioning system as is understood by those skilled in the art.

Additional vehicle environment sensors are used by the vehicle 10 to control the forward and the rearward movement of the vehicle either in a straight line path or in a curved line path, such as when the vehicle is turning at the end of rows in a field. A front wheel steering sensor 116 is operatively connected to the ECU 105 and is configured to transmit a steering angle of the front wheels. The front wheel steering sensor 116, in one embodiment, is located at a steering gearbox of a front wheel steering assembly. Other locations of the front wheel steering sensor 116 are contemplated including at a front wheel steering adjuster 118 configured to move the front wheels 14 in the desired direction. In one embodiment, the front wheel steering adjuster 118 is the steering wheel 22. In another embodiment, the front wheel steering adjuster 118 is included as a feature of the ECU 105 which automatically adjusts the direction of the front wheels 14 as describe herein. In still another embodiment, the front wheel steering adjuster 118 commands the direction of the front wheels in response signals received the global positioning system.

The vehicle 10 further includes an articulation joint adjuster 120, or articulator, which is configured to adjust the position of the rear frame 16 with respect to the front frame 12 in response to one or more of the steering wheel 22, the front wheel adjuster 118, and signals received from the electronic control unit 105 at an articulator input 121 generated in response to directional signals. An articulation joint sensor 122 is located at one or more locations on the vehicle 10. In one embodiment, the articulation joint sensor 122 is located at the articulation joint 28 and is configured to determine an amount of pivot at the articulation joint 28. In one embodiment, the articulation joint sensor 122 determines a mechanical position between a fixed part of one of the frames and a corresponding movable part that pivots about the fixed part. In another embodiment, the articulation joint sensor 122 is configured as a portion of the ECU 105 and determines the position of the rear frame 16 with respect to the front frame 12 based on the signal being transmitted to the articulation joint adjuster 120. In one embodiment, the articulator 120 includes a first and a second hydraulic cylinder each of which is coupled the front frame 12 and the rear frame 16 at the articulation joint 28. Actuation control of each of the first and second cylinders by the controller 105 adjusts the position of the rear frame 16 with respect to the front frame. Other types of articulators 120 are contemplated.

Additional vehicle environment sensors include, but are not limited to, a wheel speed sensor 124, a lateral acceleration sensor 126, and an inertial measurement sensor 128. The wheel speed sensor 124, in different embodiments, is located at one or more of the wheels 14 and 18 and determines a speed of the wheel with respect to a fixed part of the vehicle 10, such as the supporting axle. The wheel speed sensor 124 is configured to transmit a wheel speed signal to the ECU 105 that includes rotational speed information of the wheel when the wheels are providing traction or when the wheel are slipping or spinning. The ECU 105 is configured to determine when the wheels are losing traction, slipping, or spinning, by comparing the wheel speed to the ground speed signal generated by the ground speed sensor 112.

The lateral acceleration sensor 122 is operatively connected to the vehicle in one or more locations either at the front frame 12 or the rear frame 16. The lateral acceleration sensor 122, in one or more embodiments, includes a lateral accelerometer device or a sensor that measures yaw rate. In one embodiment the wheel speed sensor 122 includes two or more lateral acceleration sensors, where at least one of the sensors 122 is located at the front frame 12 and another one of the sensors is located at the rear frame 16. The inertial measurement sensor 128, in different embodiments, determines lateral acceleration of the vehicle 10, either alone or in combination with the lateral acceleration sensor 122. In different embodiments, the inertial measurement sensor 128 includes, an accelerometer, a gyroscope, a magnetometer, or a combination thereof.

The vehicle 10 further includes the operator user interface 130 that is operatively connected to the ECU 105. The user interface 130 includes various user input and/or outputs for determining and/or displaying vehicle status. The user interface 130 further includes one or more control mode inputs configured to control steering of the articulated vehicle for predetermined steering conditions. An automatic steering on and off control device 132 is configured to enable a user to set the vehicle in an automatic steering mode or in a manual steering mode in which the operator controls steering of the vehicle. When the automatic steering is turned on, a turn radius is determined by the ECU 105 based on information stored in the memory 142, or based on information received through the GPS antenna 32. In another embodiment, the user interface 130 includes a turn radius adjustment input which enables the user to select a desired turn radius. A gain control device 134 is configured to enabler a user to control a gain value of the automatic steering. For instance, a lower gain control commands the automatic steering to make steering adjustments at a lower rate of change, while a higher gain control command commands the automatic steering to make steering adjustment at a higher rate of change. The gain control device 134, therefore, enables a user to adjust the responsiveness of how quickly the steering adjustments are made.

The ECU 105, in different embodiments, includes a computer, computer system, or other programmable devices. In other embodiments, the ECU 105 can include one or more processors 140 (e.g. microprocessors), and an associated memory 142, which can be internal to the processor or external to the processor 140. The memory 142 can include random access memory (RAM) devices comprising the memory storage of the ECU 105, as well as any other types of memory, e.g., cache memories, non-volatile or backup memories, programmable memories, flash memories, and read-only memories. In addition, the memory in different embodiments includes a memory storage physically located elsewhere from the processing devices, including any cache memory in a processing device, as well as any storage capacity used as a virtual memory, e.g., as stored on a mass storage device or another computer coupled to ECU 105. The mass storage device can include a cache or other dataspace which can include databases. Memory storage, in other embodiments, is located in the "cloud", where the memory is located at a distant location which provides the stored information wirelessly to the ECU 105. When referring to the ECU 105 and the memory 142 in this disclosure other types of controllers and other types of memory are contemplated.

The ECU 105 executes or otherwise relies upon computer software applications, components, programs, objects, modules, or data structures, etc. Software routines resident in the included memory of the ECU 105, or other memory, are executed in response to the signals received from the sensors as well as signals received from the engine control unit 100, the transmission control unit 108, the ground speed sensor 112, and the GPS antenna 32. The ECU 105 also relies on computer software applications to adjust the front wheel steering operation as well as adjustment at the articulation joint. The computer software applications, in other embodiments, are located in the cloud. The executed software includes one or more specific applications, components, programs, objects, modules or sequences of instructions typically referred to as "program code". The program code includes one or more instructions located in memory and other storage devices which execute the instructions which are resident in memory, which are responsive to other instructions generated by the system, or which are provided a user interface operated by the user.

The operator of the vehicle 10 is provided with steering control modes available at the user interface 130 while operating. The angle of the steerable front wheels 14 and the angle of the rear frame 16 with respect to the front frame 12 are both adjustable. The front angle steering of the front wheels 14 is adjustable without adjustment of the articulation angle or the front angle steering is adjustable in combination with adjustment of the articulation angle. In a minimum turn radius control mode, both steering systems, the front steering and articulation steering are utilized in combination until end-of-travel is reached. In the minimum turn radius control mode, the rear tires 18, depending on the path being followed during the turn, i) do not follow in the same tracks as the front tires, as they are being steered to different curvatures, or ii) do follow in the same tracks For the minimum turn radius, the front wheels 14 are steered to a maximum angle with the articulation angle steering steered to its maximum angle. In one embodiment, the maximum steering angle of the front wheels is 5 degrees at the front axle. The maximum articulation angle is 38 degrees. Other maximum front steering angles and maximum articulation angles are contemplated.

In a controlled traffic control mode, however, the front steering system and the articulated steering system are controlled to ensure the rear tires follow in the same tracks as the front tires. When the front tires and the rear tires follow the same tracks, compaction of certain areas of the field is avoided which increases crop yield. If the tires do not follow the same tracks, however, portions of the field that have been planted could be compacted potentially reducing crop yield in those portions.

In the controlled traffic mode, the front axle steering angle is controlled relative to the articulation steering angle. For every position of the articulation steering angle, there is a corresponding front axle steering angle so that the front wheels and rear wheels track along the same path. The front angle steering angle and the articulation angle depend on the final configuration of the work vehicle, particularly with respect to the front axle to articulation axis dimensions and the rear axle to articulation axis dimensions. In one embodiment, the front axle angle is equal to the articulation angle divided by seven (7). The ratio between the front axle steering angle to the articulation angle is based on the final wheelbase and the position of the articulation axis. In other embodiments, other ratios between the front axle steering angle to the articulation angle for the controlled traffic mode are contemplated.

In one embodiment of the automatic mode, the GPS system provides automatic control of the steering throughout a field being tilled, being planted, or being harvested. In this embodiment, the user interface includes a controlled traffic/minimum turn selector 136 available to the operator at the user interface 130. In this embodiment, while the GPS system provides directional information to move the vehicle throughout the field, the state selected at the selector 136 is used to make vehicle turns at the ends of the rows, for example, either a controlled traffic turn or a minimum turn. In another embodiment, the GPS system provides steering information throughout a field including whether the turns are controlled traffic turns or minimum turns or any other type of turns.

In one embodiment of the vehicle 10, the front steering system is an Ackerman steering system which limits the turning angle of the front wheels to no greater than a predetermined amount. Other types of steering systems are also contemplated. In one embodiment of Ackerman steering, the turning of the front wheels is limited to be up to 7 degrees. Other maximum steering angles, either larger are smaller than 7 degrees, are also contemplated. Since the vehicle 10 includes the articulator 120, the vehicle 10 is capable of achieving smaller turning radiuses when needed. The ECU 105 is configured to establish the turning radius by use of the front wheel turning radius in combination with the articulation of the rear frame 16. In one example, articulation of the rear frame 16 does not occur until the limit set by the Ackerman steering is reached or close to being reached. For instance, a turn of 7 degrees is achieved completely by the Ackerman steering. In another example, however, the rear frame 16 is gradually articulated in combination with turning of the front wheel. For instance, to achieve a turn of 7 degrees the front wheel turn angle is set to 4 degrees and the articulation angle is set to 3 degrees. Consequently, a minimum turn radius is set by the turn angle of the front wheels and the articulation angle of the rear frame 16 with respect to the front frame 12.

Figure 5:
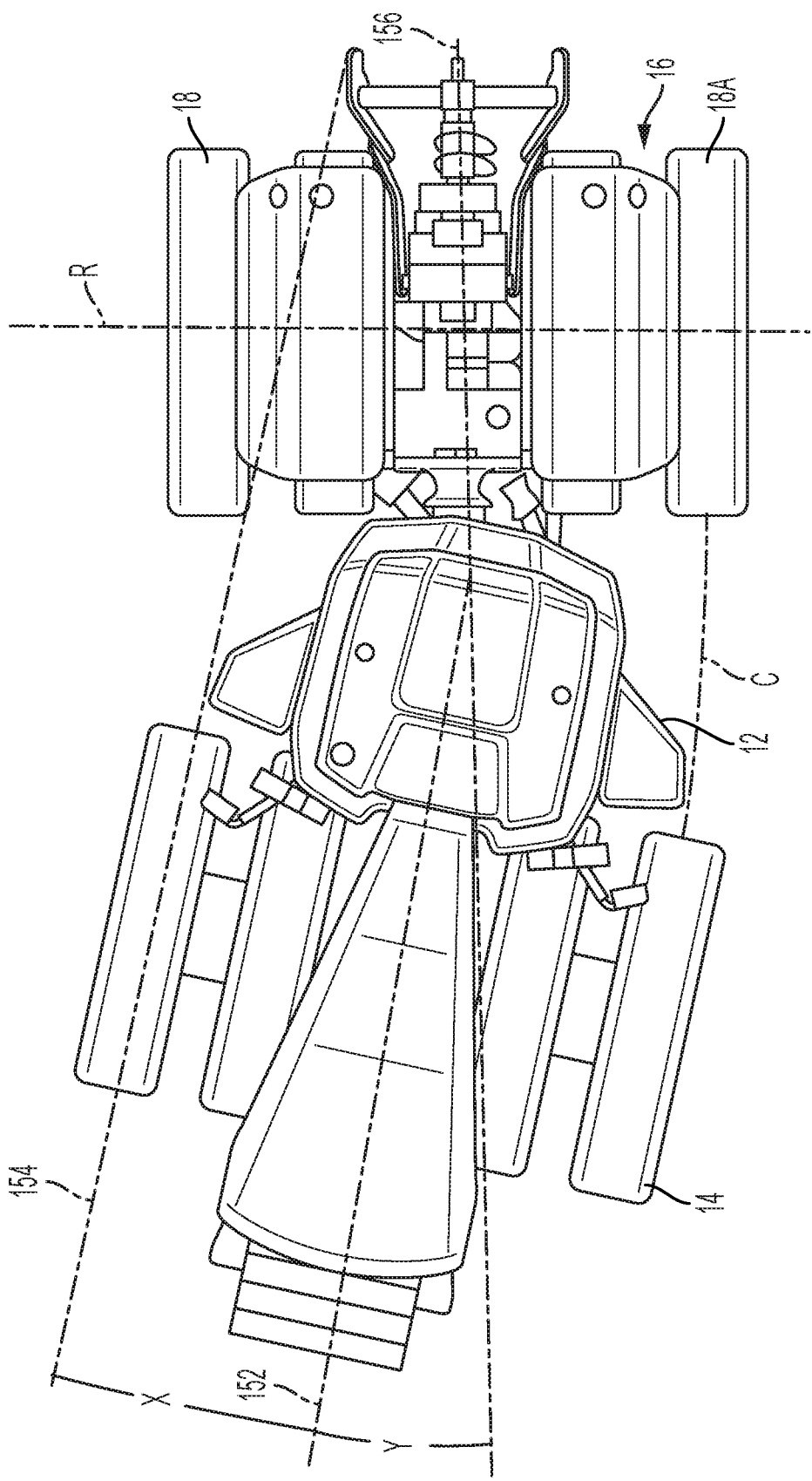
FIG. 5 is a top view of an articulated tractor having a front frame and a rear frame with the front wheels aligned at a steering angle relative to the front frame and the front frame articulated with respect to a rear frame at a first angle.
Figure 6:
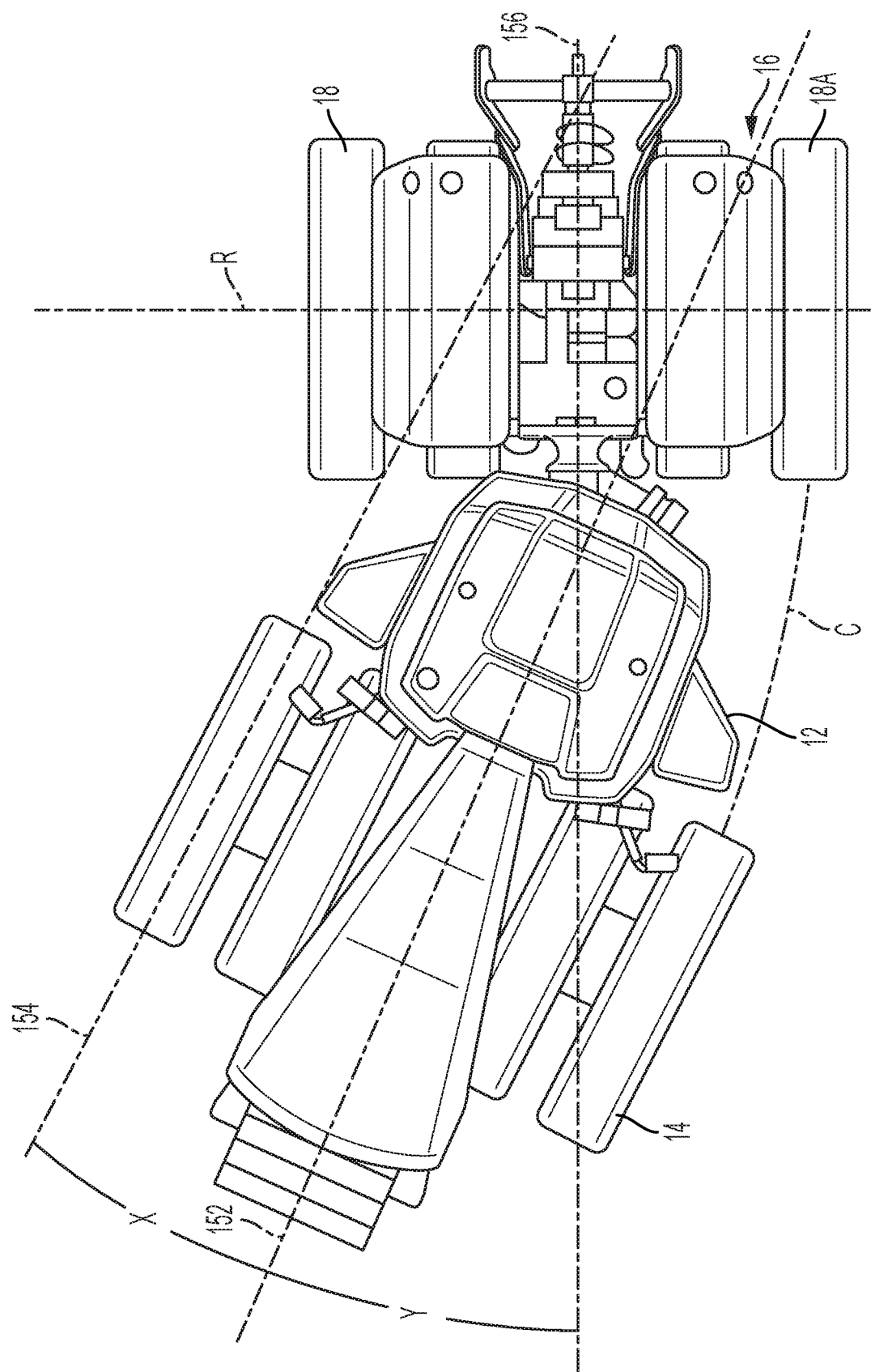
FIG. 6 is a top view of an articulated tractor having a front frame and a rear frame with the front wheels aligned at a steering angle relative to the front frame and the front frame articulated with respect to a rear frame at a second angle.
Figure 7:
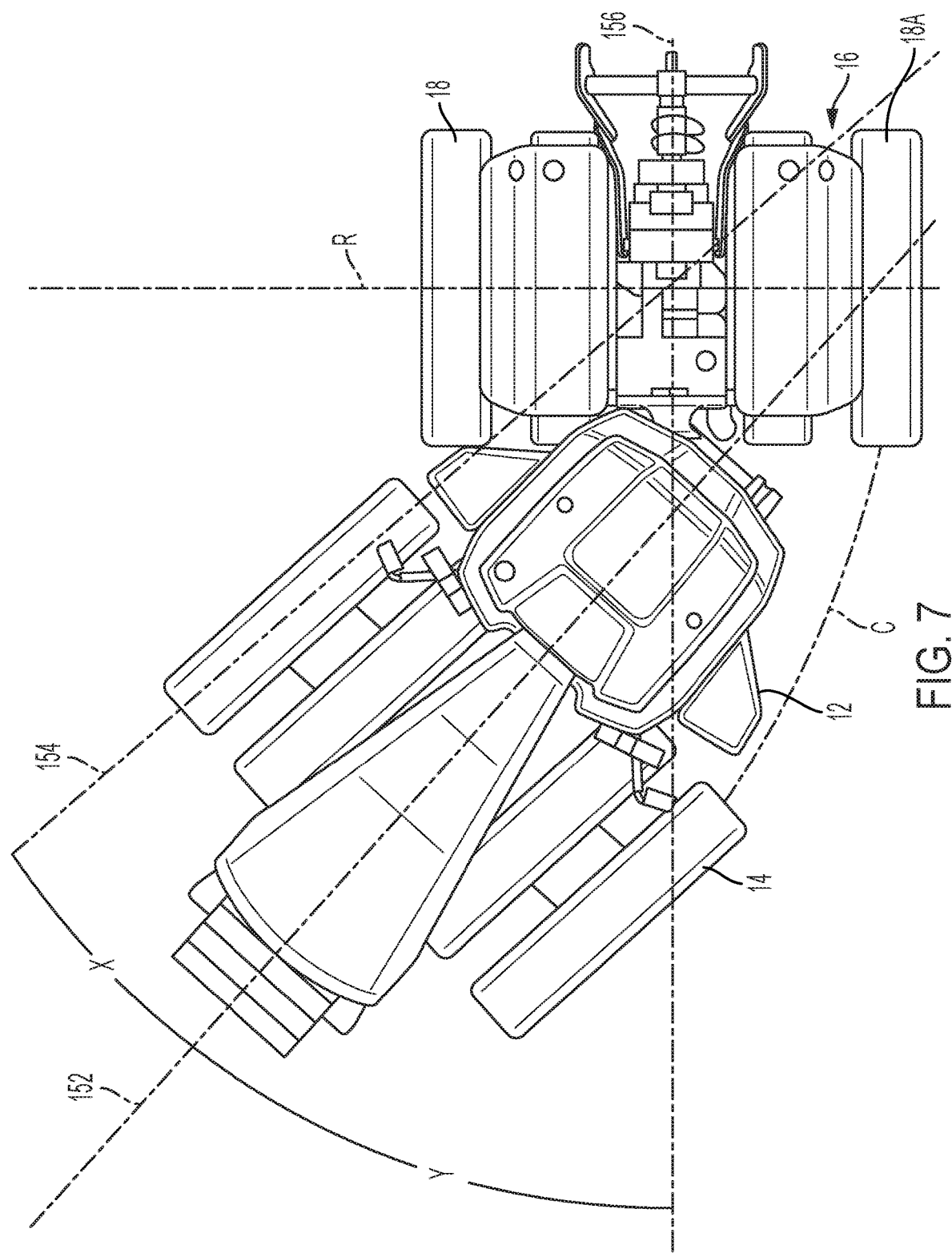
FIG. 7 is a top view of an articulated tractor having a front frame and a rear frame with the front wheels aligned at a steering angle relative to the front frame and the front frame articulated with respect to a rear frame at a third angle.

FIGS. 5-7 illustrate a vehicle 10 at various articulation angles Y and steering angles X. The articulation angle Y can be any angle up to an allowable articulation angle of the respective vehicle. The front steering angle X can be any angle up to an allowable front steering angle of the respective vehicle. FIG. 5 illustrates a vehicle 10 with the front wheels 14 aligned at a steering angle X relative to the front frame 12 with the front frame 12 articulated with respect to a rear frame 16 at an articulation angle Y. In this embodiment the angle X is 5 degrees and the angle Y is 12 degrees. The vehicle turn angle is 17 degrees to the right with the vehicle moving to the left of the page.

FIG. 6 illustrates a vehicle 10 with the front wheels 14 aligned at a steering angle X relative to the front frame 12 with the front frame 12 articulated with respect to the rear frame 16 at an articulation angle Y. In this embodiment the angle X is 5 degrees and the angle Y is 25 degrees. The vehicle turn angle is 30 degrees to the right with the vehicle moving to the left of the page.

FIG. 7 illustrates a vehicle 10 with the front wheels 14 aligned at a steering angle X relative to the front frame 12 with the front frame 12 articulated with respect to the rear frame 16 at an articulation angle Y. In this embodiment the angle X is 5 degrees and the angle Y is 38 degrees. The vehicle turn angle is 42 degrees to the right with the vehicle moving to the left of the page.

When the vehicle 10 is articulated and the front wheels 14 are steered in the same direction as the articulation, as shown for example in FIGS. 5-7, the longitudinal axis 152 of the front frame 12 is at an angle Y greater than zero to the longitudinal axis 156 of the rear frame 16, and the longitudinal axis 154 of the front wheels 14 are at an angle X greater than zero to the longitudinal axis 152 of the front frame 12.

Figure 8:
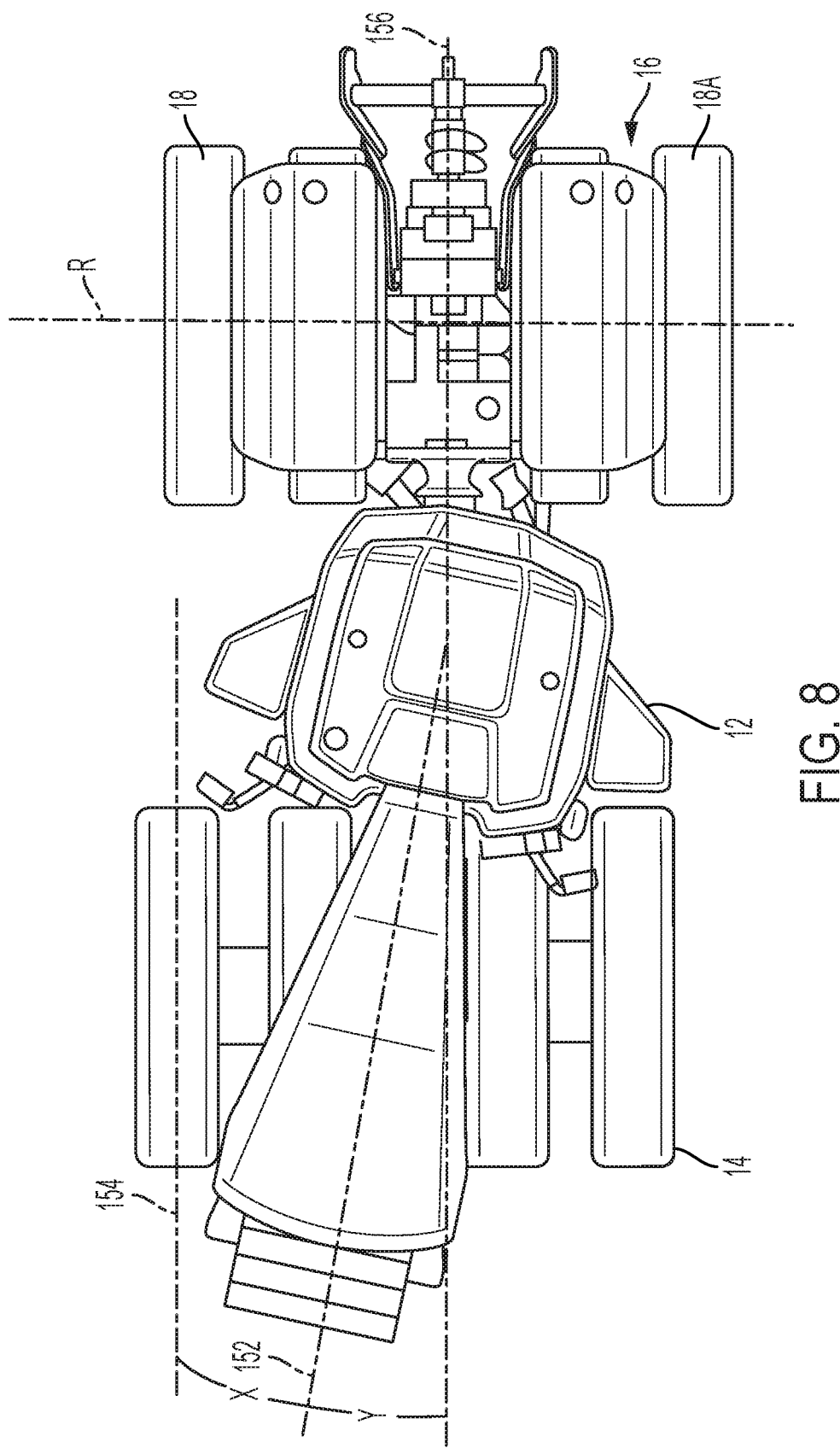
FIG. 8 is a top view of an articulated tractor having a front frame and a rear frame with the front wheels aligned with respect to a front frame in a direction opposite an articulation angle of the rear frame with respect the front frame.

FIG. 8 illustrates a vehicle 10 with the articulation X in one direction and the steering angle Y in the opposite direction with the front wheels and rear wheels substantially parallel and offset. When the vehicle 10 is articulated and the front wheels 14 are steered in the opposite direction of the articulation, as shown for example in FIG. 8, the longitudinal axis 152 of the front frame 12 is at an angle Y greater than zero to the longitudinal axis 156 of the rear frame 16, and the longitudinal axis 154 of the front wheels 14 are at an angle X greater than zero, in an opposite direction of the angle Y, to the longitudinal axis 152 of the front frame 12. When the angles X and Y are substantially the same magnitude, but in opposite directions, the longitudinal axis 154 of the front wheels 14 is substantially parallel and offset to the longitudinal axis 156 of the rear frame 16, as shown in FIG. 8.

Figure 9:
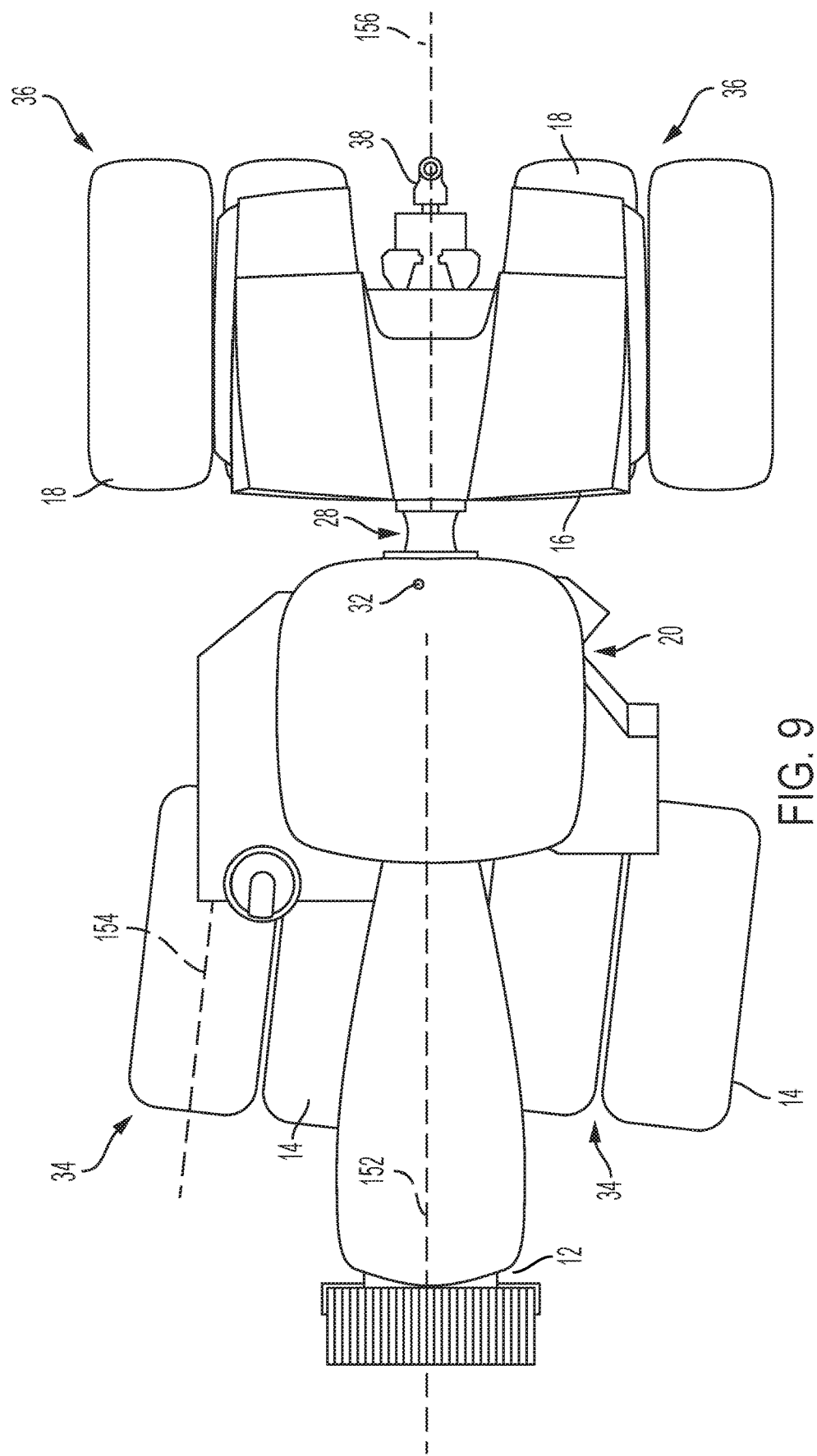
FIG. 9 is a top view of an articulated tractor steered with respect to the front frame and without any articulation of the rear frame with respect to the front frame.

FIG. 9 illustrates a vehicle 10 with the front wheels 14 steered without any articulation. When the front wheels 14 are steered without articulation, as shown for example in FIG. 9 the longitudinal axis 152 of the front frame 12 is substantially parallel and collinear to the longitudinal axis 156 of the rear frame 16, and the longitudinal axis 154 of the front wheels 14 are at an angle X greater than zero to the longitudinal axis 152 of the front frame 12.

Consequently, the present disclosure describes a system that provides the operator with steering control modes while performing construction, agricultural, or other operations using an articulated vehicle with an additional steerable front axle. In the minimum turn radius control mode, both steering systems are utilized until end-of-travel is reached, and the rear tires may not always follow in the same tracks as the front tires, as they are being steered to different curvatures. In the controlled traffic control mode, the steering systems are controlled to ensure the rear tires follow in the same tracks as the front tires for controlled traffic operations.

While exemplary embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An articulated vehicle for moving along a surface comprising:
   a front frame supported by front wheels;
   a front wheel steering system operatively connected to the front wheels and configured to adjust a position of the front wheels with respect to the front frame, the front wheel steering system including a steering control input;
   a rear frame rotatably coupled to the front frame at a pivot defining an axis of articulation, the rear frame supported by rear wheels;
   an articulator disposed at or near the pivot, wherein the articulator is configured to adjust the position of the rear frame with respect to the front frame at the axis of articulation, the articulator including an articulator input; and
   a user input operatively connected to the steering control input and operatively connected to the articulator input, wherein the user input includes a control mode input configured to automatically control steering of the articulated vehicle for predetermined steering conditions, wherein the control mode input includes a minimum turn radius in which the front wheels are steered to a maximum steering angle and the articulation angle steering is steered to a maximum articulation angle.

2. The articulated vehicle of claim 1 wherein the control mode input includes a controlled traffic control mode wherein for every position of an articulation steering angle there is a corresponding front axle steering angle and a ratio between the front axle steering angle and the articulation steering angle is based on a wheelbase and a position of an articulation axis of the articulated vehicle.

3. The articulated vehicle of claim 1 wherein the user input includes a gain control input configured to adjust the responsiveness of the front wheel steering system when positioning the front wheels.

4. The articulated vehicle of claim 2 further comprising a controller operatively connected to the steering control input, to the articulator input, and to the user input, wherein the controller, in response to the controlled traffic control mode, provides a first control signal to the steering control input to position the front wheels and to the articulator input to position the rear wheels.

5. The articulated vehicle of claim 4 wherein in response to the controlled traffic control mode, the first control signal positions the front wheels and the rear wheels along a same path to ensure the rear wheels track along the same path as the front wheels.

6. The articulated vehicle of claim 4 wherein the controller in response to the minimum turn radius mode provides a second control signal to the steering input to position the front wheels and the rear wheels along different paths to provide a minimum turn radius for the vehicle.

7. The articulated vehicle of claim 4, wherein the control signal provided by the controller to the articulator input includes one of: i) a signal configured to positively position the rear frame based on the control signal provided at the steering control input; or ii) a signal configured to disable positive positioning of the rear frame with respect to the front frame.

8. The articulated vehicle of claim 4 further comprising an antenna to receive a steering instruction to direct the vehicle along the surface, the controller being operatively connected to the antenna to receive the steering instruction, wherein the control signal provided to the steering control input by the controller is based on the steering instruction.

9. The articulated vehicle of claim 8 further comprising a user interface operatively connected to the controller, wherein the user interface includes a display and the user input, wherein the user input includes an automatic steering mode and manual steering mode.

10. The articulated vehicle of claim 9 wherein the automatic steering mode includes an input to select the minimum turn radius control mode or the controlled traffic control mode.

11. An automatic steering system for an articulated work vehicle having a front frame, including a front wheel steering system supported by front wheels, a rear frame supported by rear wheels and rotatably coupled to the front frame at a pivot defining an axis of articulation, an articulator configured to adjust the position of the rear frame with respect to the front frame, and a receiver configured to receive a steering instruction, the automatic steering system comprising:
 a front wheel steering sensor operatively connected to the front wheel steering system;
 an articulation joint sensor operatively connected to the articulator;
 a front wheel steering control input operatively connected to the front wheel steering system;
 a user interface operatively connected to a controller, wherein the user interface includes a display and a user input, wherein the user input includes an automatic steering mode and a manual steering mode, wherein the automatic steering mode includes an input to select a minimum turn radius control mode or a controlled traffic control mode;
 an articulator input operatively connected to the articulator; and
 the controller operatively connected to the front wheel steering sensor, to the articulation joint sensor, to the front wheel steering control input, to the articulator input, and to the receiver to receive the steering instruction, the controller including a processor and a memory, wherein the memory has a plurality of program instructions stored thereon, that in response to execution by the processor causes the controller to:
 identify a position of the front wheels with the front wheel steering sensor;
 identify a position of the rear wheels with the articulation joint sensor;
 generate a first control signal based on the steering instruction and the identified position of the front wheels;
 generate a second control signal based on the steering instruction and the identified position of the rear wheels; and
 adjust the position of the front wheels based on the first control signal and adjust the position of the rear wheels based on the second control signal.

12. The automatic steering system of claim 11 wherein the processor causes the controller to adjust the front wheels and the rear wheels to follow a same path to ensure that the rear wheels track along the same path as the front wheels.

13. The automatic steering system of claim 11 wherein the processor causes the controller to adjust the front wheels and the rear wheels to follow the different paths to enable a minimum turn radius for the articulated vehicle.

14. The automatic steering system of claim 11 wherein the controlled traffic mode adjusts the front wheels and the rear wheels to follow a same path to ensure that the rear wheels track along the same path as the front wheels.

15. The automatic steering system of claim 14 wherein the minimum turn radius control mode adjusts the front wheels to a maximum turn angle and articulator to a maximum turn angle such that front wheels and the rear wheels follow different paths to enable a minimum turn radius for the articulated vehicle.

16. A method of automatically steering an articulated work vehicle having a front frame, including a front wheel steering system supported by front wheels, a rear frame supported by rear wheels and rotatably coupled to the front frame at a pivot defining an axis of articulation, an articulator configured to adjust the position of the rear frame with respect to the front frame, the method comprising:
 receiving, at the articulated work vehicle, a steering control signal from a global positioning system;
 adjusting a front axle steering angle of the front wheels using the front wheel steering system based on the received steering control signal; and
 adjusting a position of the rear wheels to an articulation steering angle using the articulator, wherein for every position of the articulation steering angle there is a corresponding front axle steering angle based on the received steering control signal to position of the rear wheels to follow a same path as the front wheels to ensure that the rear wheels follow in the same path as the front wheels.

17. The method of claim 16 wherein the adjusting a position of the rear wheels further comprises adjusting a position of the rear wheels using the articulator based on the received steering control signal to position of the rear wheels to follow a different path than the front wheels to enable the articulated vehicle to enable a minimum turn radius for the articulated vehicle.

18. The method of claim 16 determining the state of a user control device, wherein the state includes one of an automatic steering mode and a manual steering mode, and if the state of the user control device is the manual steering mode, not adjusting the position of the front wheels and not adjusting the position of the rear wheels based on the received steering control signal.

\* \* \* \* \*